United States Patent
Strazzabosco

[19]

[11] Patent Number: 5,816,689
[45] Date of Patent: Oct. 6, 1998

[54] APPARATUS AND ASSOCIATED METHOD FOR CREATING A BROAD AREA OF ILLUMINATION

[76] Inventor: Frank Strazzabosco, 4556 Maple Ct., Boulder, Colo. 80301-5829

[21] Appl. No.: 681,263

[22] Filed: Jul. 22, 1996

[51] Int. Cl.⁶ .............................. F21V 21/26; F21V 21/28
[52] U.S. Cl. ..................... 362/272; 362/188; 362/285; 362/277; 362/120
[58] Field of Search .................... 362/272, 187, 362/188, 285, 286, 287, 288, 277, 109, 120; 235/4

[56] References Cited

U.S. PATENT DOCUMENTS

| | | | |
|---|---|---|---|
| Re. 22,096 | 5/1942 | Monroe | 362/272 |
| 1,537,332 | 5/1925 | Carney | 362/272 |
| 1,569,282 | 1/1926 | Hughes | 362/272 |
| 1,575,403 | 3/1926 | Yeager | 362/272 |
| 2,261,222 | 11/1941 | Buell | 362/272 |
| 2,268,476 | 12/1941 | Duncan | 362/272 |
| 2,446,333 | 8/1948 | Kennelly | 362/272 |
| 3,675,073 | 7/1972 | Hogue | 315/149 |
| 3,963,956 | 6/1976 | Beining | 315/71 |
| 4,091,313 | 5/1978 | Genovese | 318/439 |
| 4,223,376 | 9/1980 | Ikeda | 362/112 |
| 4,303,970 | 12/1981 | Robertson | 362/186 |
| 4,388,673 | 6/1983 | Maglica | 362/183 |
| 4,423,471 | 12/1983 | Gordin et al. | 362/272 |
| 4,479,171 | 10/1984 | Mains | 362/120 |
| 4,496,831 | 1/1985 | Swartz et al. | 362/288 |
| 4,533,984 | 8/1985 | Gatton | 362/288 |
| 4,654,764 | 3/1987 | Hsiao | 362/199 |
| 4,797,796 | 1/1989 | Eastman, II et al. | 362/199 |
| 4,841,129 | 6/1989 | Tawara et al. | 235/472 |
| 4,935,855 | 6/1990 | Narita | 362/287 |
| 5,051,678 | 9/1991 | Rohr et al. | 235/472 |
| 5,072,347 | 12/1991 | Brunson | 362/194 |
| 5,095,414 | 3/1992 | Tinus | 362/284 |
| 5,115,120 | 5/1992 | Eastman | 235/472 |
| 5,144,120 | 9/1992 | Krichever et al. | 235/472 |
| 5,206,492 | 4/1993 | Shepard et al. | 235/472 |
| 5,239,451 | 8/1993 | Menke et al. | 362/199 |
| 5,252,816 | 10/1993 | Onimaru et al. | 235/472 |
| 5,401,948 | 3/1995 | Krichever et al. | 235/472 |
| 5,712,471 | 1/1998 | Bremer | 235/472 |
| 5,750,976 | 5/1998 | Eastman et al. | 235/472 |

*Primary Examiner*—Stephen F. Husar
*Assistant Examiner*—Matthew J. Spark
*Attorney, Agent, or Firm*—Sheridan Ross PC

[57] ABSTRACT

An illuminating service for creating a broad area of illumination is preferably enclosed in a compact and hand held housing, and includes an illumination source consisting of a bulb and a reflector. The illumination source is directly connected to a moving means using an attachment means, and is rotated at a frequency to provide an increased area of illumination having an intensity perceived as being substantially equivalent to that of a non-rotating beam when viewed by an observer. In addition, an energy reuse and DC notching reducer are disclosed that includes a load member and an energy storage means that are operatively connected with a pair of switches. The switches are selectively energized as to allow current to pass through the load member and to allow the energy storage means to store and discharge energy such that the energy is recycled through the load member.

18 Claims, 7 Drawing Sheets

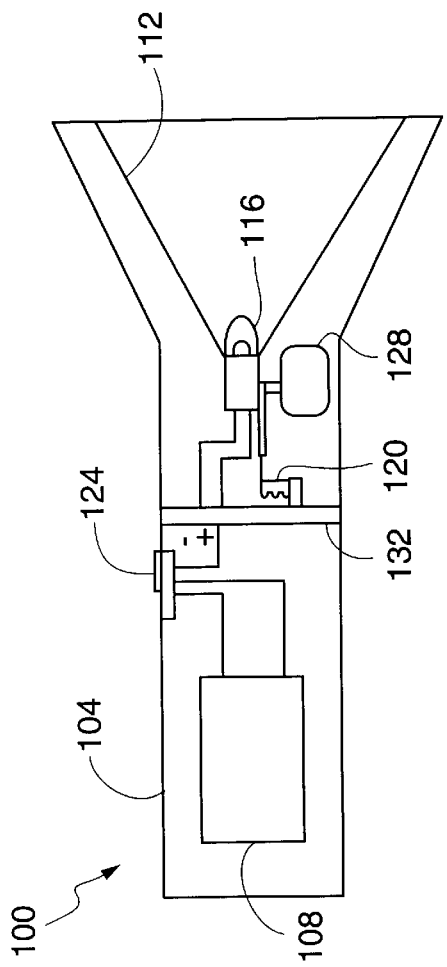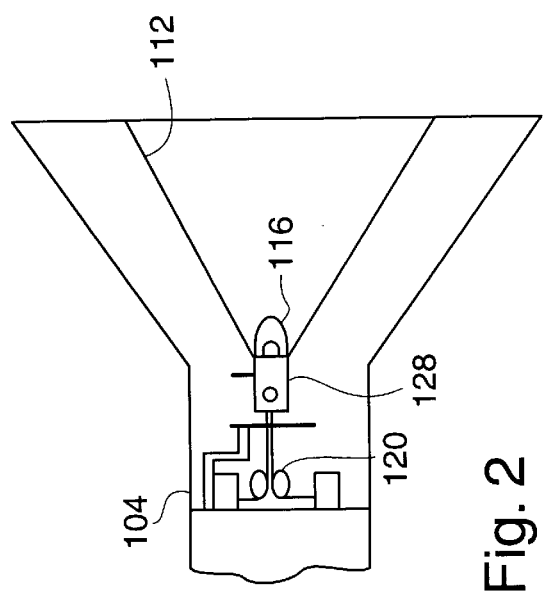

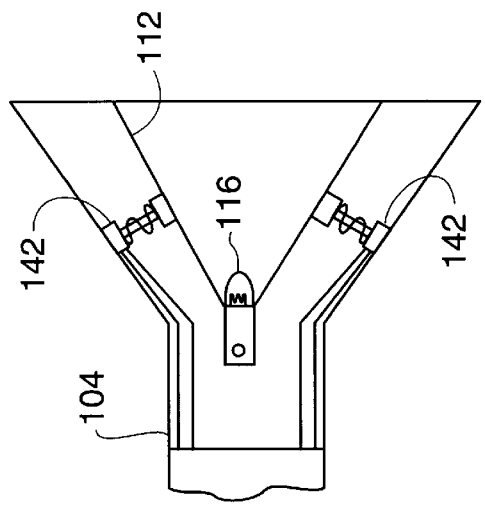
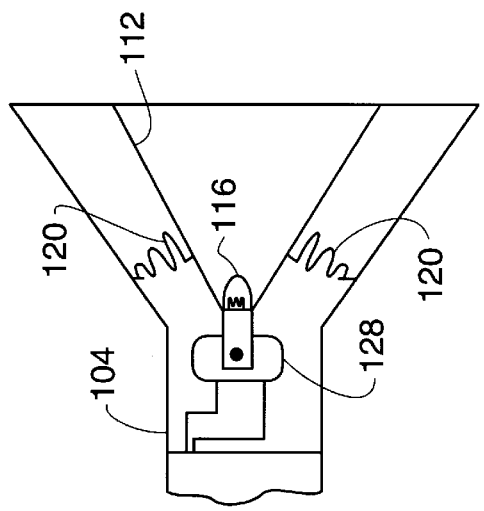
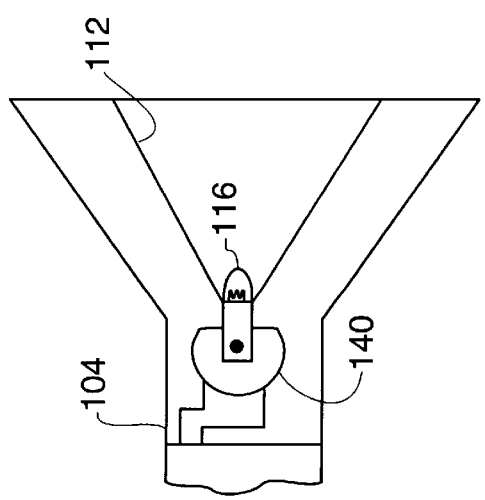

APPARATUS AND ASSOCIATED METHOD FOR CREATING A BROAD AREA OF ILLUMINATION

FIELD OF THE INVENTION

The present invention relates to illumination devices that provide a broad area of light. More particularly, the invention concerns a compact hand held light source that creates a large area of light by rotating a bulb and a reflector being directly connected to a motor and having a beam intensity relatively equivalent to that of a static beam of light when viewed by an observer.

BACKGROUND OF THE INVENTION

Hand held portable lights have existed for years. One such hand held light source is a flashlight. Typically, a flashlight includes a bulb and a parabolic reflective mirror, the bulb being electrically connected to a battery. When energized, the parabolic reflective mirror and the bulb create a static spot of illumination. The resulting spot of light has a fairly intense beam, but the illumination extends over a relatively small area. For some uses, especially those involving law enforcement and security lighting, a larger area of illumination having approximately the same beam intensity as a static spot of light is desired from a compact hand held unit.

A significant problem experienced in hand held light designs, especially oscillating lights, concerns the drain on battery power. Moreover, due to the conventional manner in which electricity is supplied to a bulb, bulb filaments are "notched", thus limiting their effective life.

In a patent by Eastman (U.S. Pat. No. 4,797,796), an apparatus is provided that oscillates a beam of light to create a large and relatively intense area of illumination. The Eastman apparatus uses a motor to rotate one magnet. The rotating magnet creates a magnetic force on another set of stationary magnets located on a bulb reflector, thus causing the bulb reflector to oscillate back and forth. By rotating the magnet at a certain velocity, the reflector is oscillated to create an area of light larger than that of a static beam. Unfortunately, the rotating magnet has difficulty creating a smoothly oscillating light source. Furthermore, fabrication of the rotating apparatus is both difficult and expensive. In addition, the energy required to rotate the magnet and to oscillate the reflector is significant, resulting in the considerable consumption of energy and thus, a fairly limited battery life.

Therefore, a need exists for an illumination source that is compact, provides a large area of illumination, has a relatively high beam intensity, and that conserves battery life. In addition, a preferred illumination device should be relatively inexpensive, should have a low power consumption, and should be constructed in manner to extend the bulb life of the device.

SUMMARY OF THE INVENTION

An object of the present invention is to provide an illumination device that creates a large area of light having a relatively high beam intensity when viewed by an observer. A further related objective is to provide a power recycling system that is used to decrease the power consumption of the illumination device. A DC notching reducer is also provided to increase the life of the bulb filament used in the illumination device. In connection with these objectives, an illumination device has been provided that is relatively inexpensive and has a low power consumption.

One particular aspect of the present invention is directed to relatively compact and hand held devices, although the present invention finds application in various other fields, including street lights, automobile headlights, etc.

In one aspect of this invention, an illumination device is provided that includes an illumination source that projects a static beam of light. The illumination source is rotated by a means for moving at a frequency that creates an increased area of light having relatively the same intensity as the static beam of light when viewed by an observer. The means for moving and the illumination source is connected by an attachment means, such attachment means comprising any suitable element that facilitates connection between the bulb or reflective mirror, such as a spring, a string, a rod or any other elastic connection. In one particular aspect of this invention, the illumination source includes a reflector connected to a bulb. The bulb used in the preferred embodiment may be an incandescent bulb, a fluorescent bulb or a gas discharge bulb. The bulb is electrically coupled to a power source. The power source may include a battery, a fuel cell, a solar power source, an AC power source, a DC power source, or an AC to DC converted power source.

The reflector, bulb and energy source may be enclosed in a housing. At least one attachment means (e.g. preferably, an elastomeric member such as a spring) connects the reflector to the housing. A motor is also directly connected to the reflector/bulb assembly, such motor is rotatable with respect to the housing. The elastomeric member contains an appropriate stiffness to ensure that the reflector/bulb assembly returns to a neutral or straight ahead position after being acted upon by the mechanically resonating system. The rotation of the motor excites the mechanical system, which includes the elastomeric member and the reflector/bulb assembly, into its resonant frequency. Further, the rotation of the reflector creates an enlarged area of illumination while keeping the beam intensity relatively equivalent to that of a static beam when viewed by an observer. The motor is capable of rotating the reflector to a frequency of at least one hertz, and in a preferred embodiment, the frequency should range between 10 to 60 hertz, and in a more preferred embodiment, the frequency should range from 12 to 17 hertz. In addition, the illumination source may rotate through an angle of at least 10°, and in a preferred embodiment, rotation is between about 15° and 75°.

A switch may be used to selectively connect or disconnect the motor or light from the power source. Again, although in the preferred embodiment the illumination device is compact and hand held, illumination sources such as street lights, automobile headlights and display lights may be used.

In another aspect of the invention, a device for recycling electrical power is provided. The device includes a load member having a first and second terminal, that receives electrical power from a means for receiving and supplying electrical power. The load member may be a motor or a bulb, or any other device that requires electrical energy to operate. A means for storing electrical power has a first terminal connected to a common ground and a second terminal connected to the first terminal of the load member. In a preferred embodiment, the means for storing electrical power is a capacitor. A first switch, having at least a first and second terminal, has the first terminal connected to the second terminal of the load member, and the second terminal of the first switch is connected to the means for receiving and supplying electrical power. A second switch is connected in parallel with the series combination of the load member and the means for storing electrical power. In a preferred embodiment, the first and second switches are transistors, relays or electromechanical switches. A means for selectively energizing the first and second switches is also provided to create two alternating states where one switch is on and the other switch is off.

Another aspect of the invention relates to a device for recycling electrical power, such device being useful, for example, in extending battery life. The device has a battery and a load member electrically connected in a circuit so that power is conveyed from the battery to the load member. After passing through the load member, the power is stored in the energy storage device, and is subsequently discharged through the load member. In a preferred embodiment, the load member may be a motor, a light bulb or an electronic device. The battery life is extended because the battery is used to provide power to the load member for one half the time. During the other portion of time, the recycled power from the energy storage device powers the load member. An extension of battery life from two to three times can be achieved using the present invention.

When the device for recycling electrical power has a load member that is a bulb, the circuit described may be used to reduce the DC notching effect in the bulb filament. Typically, DC notching occurs in a bulb filament when current is allowed to flow in only one direction through the bulb filament. The DC notching effect is reduced by first electrically connecting the bulb, having first and second connective ends, to the circuit. The current is allowed to flow in a first direction through the bulb filament (through the first end and out the second end) and the current is then used to charge a storage device. When the storage device discharges, the current is then allowed to flow in a second direction through the bulb (through the second end and out the first end). Therefore, this reversible flow of current reduces the DC notching effect that is typically found in bulbs that allow current to flow in only one direction through the bulb filament.

Other embodiments and features of the present invention are disclosed in the Figures and the Detailed Description of the invention.

BRIEF DESCRIPTION OF THE DRAWINGS

FIG. 1 shows a side view of one embodiment of the illumination device;

FIG. 2 shows a top view, partially in section, of one embodiment of the illumination device;

FIG. 4 shows a top view, partially in section, of another embodiment of the illumination device;

FIG. 5 shows a top view, partially in section, of yet another embodiment of the illumination device;

FIG. 6 shows a top view, partially in section, of still another embodiment of the illumination device.

DETAILED DESCRIPTION OF THE INVENTION

Figure 3:
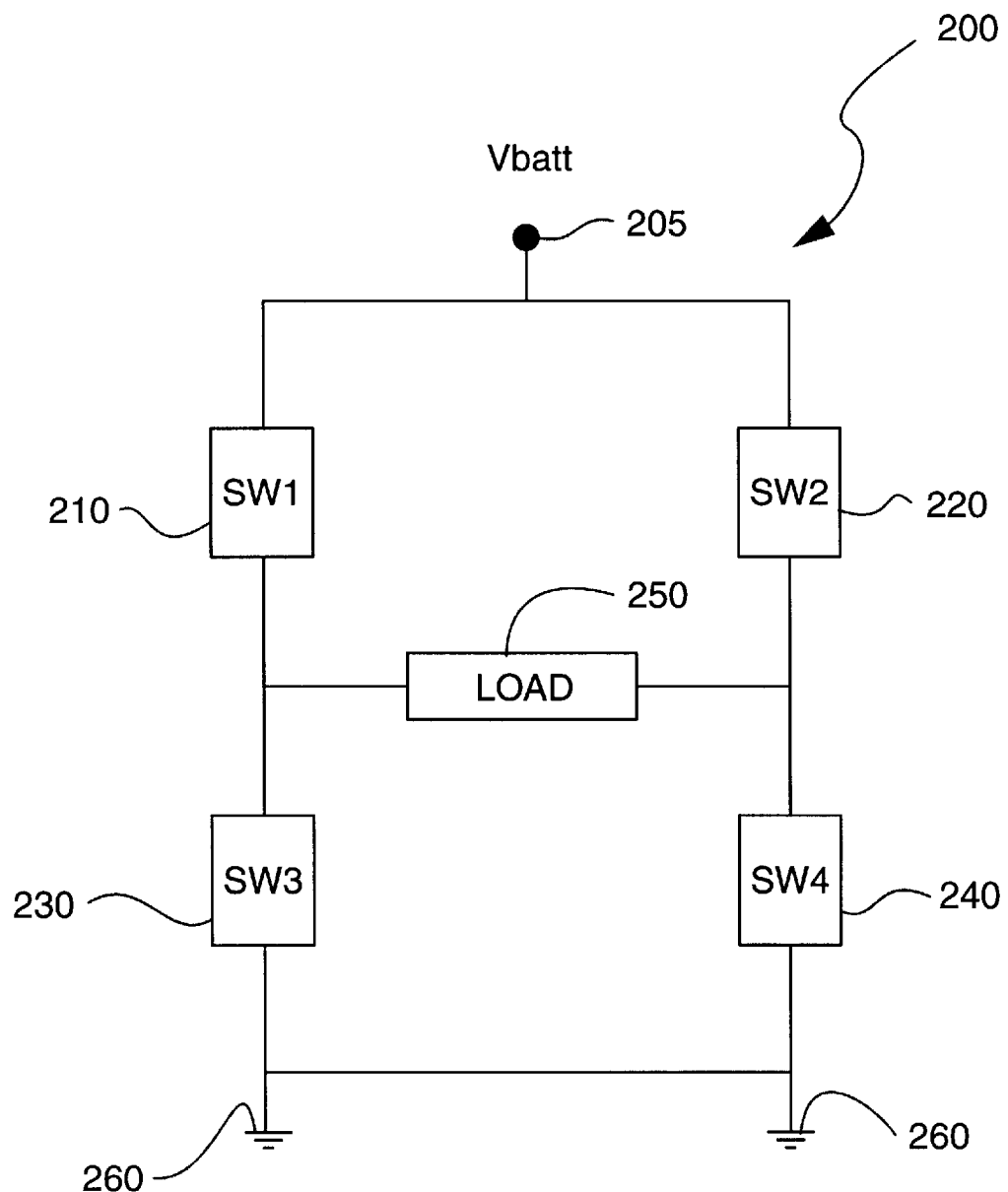
FIG. 3 shows a block diagram of a standard H-bridge configuration.

One aspect of the invention is directed to an apparatus for creating a broad area of illumination from a relatively compact hand held light source. In this regard, the illumination device includes an illumination source capable of projecting a static beam of light. A means for moving the illumination source is provided such that the illumination device is capable of being rotated at a frequency to provide an enlarged area of light having an intensity that is preferably equivalent to that of the static beam of light when viewed by an observer. Further, an attachment means is provided for a direct connection between the illumination source and the means for moving. The attachment means may also include an elastomeric member for creating a mechanical resonant system where a means for moving excites the mechanical system to a resonant frequency for creating the enlarged area of illumination. The present invention has various useful applications, including a flashlight, a street light, and automobile light, a security light or a display light.

Referring to FIGS. 1 and 2, in a preferred embodiment, an illumination device 100 includes housing 104 which further includes a means for receiving and supplying power (e.g. battery 108) selectively activated by switch 124 and a reflector 112 for intensifying the light from bulb 116. In addition, a motor 128 is directly connected to the reflector 112 and bulb 116 assembly. Counter-wound or attached elastomeric members 120 may be attached to appropriate locations such that the rotation of the motor 128 will excite the mechanical system into its resonant frequency and thus create a relatively enlarged area of illumination.

In one embodiment, the illumination device 100 may be portable and hand held. The housing 104 contains the battery 108 which is connected to switch 124 such that the battery 108 is capable of being selectively connected or disconnected from the motor 128 and/or the bulb 116 or, in another embodiment, the switch 124 selectively connects and disconnects the battery 108 from the control system 132. In other embodiments, the battery 108 may be substituted with a fuel cell, solar power source, an AC power source, a DC power source or an AC to DC power converted power source. In addition, the switch 124 may be remotely, electrically or mechanically activated.

The reflector 112, which is connected to (e.g. surrounding) the bulb 116, intensifies and focuses the light from the bulb 116 into a beam of light, and is preferably parabolically shaped. In a preferred embodiment, the bulb 116 is an incandescent light bulb, but may be substituted for a fluorescent bulb, a krypton bulb, a xenon bulb, a sulfur bulb, a gas discharge bulb or a halogen bulb.

The bulb 116 and reflector 112 assembly is directly attached to the motor 128 (e.g. rather than by using an indirect means such as magnets). In order to create an enlarged area of illumination, the motor 128 is used to rotate the reflector 112 and bulb 116 through an angle of at least about 10°, more preferably between about 15° and about 75° and even more preferably between about 25° and about 60°. The motor 128 may be selected from a reciprocal electromagnetic driver, a piezoelectric driver, a rotary solenoid and a linear solenoid. Rotation of the illumination device 100 should be understood as including linear movement from side-to-side, as well as in smaller circular or elliptical partial orbits, thus creating illumination patterns of broad light beam swaths, larger circles of light, etc.

Elastomeric members 120 may be attached at appropriate locations to the motor 128, reflector 112 and/or bulb 110 assembly. Attachment of the elastomeric members 120 creates a mechanically resonant system wherein the elastomeric members 120 may be counter-wound and attached such that the rotation by the motor 128 at a frequency of at least 1 Hz, excites the mechanical system into resonance. In a preferred embodiment, the rotational frequency should range between 10 and 60 hertz, and in a more preferred embodiment, the frequency should range between 12 and 17 hertz. A control system 132 is used to bias the motor 128 positively and negatively to create a clockwise and counter-clockwise rotation of the motor 128, and such a rotation of motor 128 at the resonant frequency, in combination with the elastomeric members 120, causes the reflector 112 and bulb 116 system to oscillate back and forth when the control system 132 is energized. This rapid back-and-forth motion of the reflector 112 and bulb 116 assembly creates an enlarged area of illumination which is perceived as being substantially continuous to an observer. When the control system 132 is de-energized, the reflector 112 and bulb 116 system are caused to return to a neutral or straight-ahead position due to the action of elastomeric members 120. In a preferred embodiment as shown in FIG. 4, elastomeric members 120 are used to create the mechanically resonant system, but such elastomeric members 120 may compromise an elastomeric band, a spring, a string or any other substantially elastic connection.

In yet another embodiment, the illumination device 100, as shown in FIG. 1, may be contained in a police baton 101. In this embodiment, the housing 104 may be weighted, elongated and shaped such that it is capable of use during police activities. The bulb 116 and reflector 112 assembly may be located at one end of the police baton while the battery 108 may be housed in the other end. The switch 124, mounted on or integrated in housing 104, may be electrically connected between the battery 108 and the control circuit 132. An operator may use the switch 124 to toggle between three operating position. In a first operating position, the battery 108 is disconnected from the control circuit 132 and the illumination device 100 is de-energized. When the operator selects the second operating position, the battery 108 is connected to the control circuit 132 and a static beam of light is created. When the third mode is activated, the battery 108 is connected to the control circuit 132 which activates the bulb 116, the motor 128 and spring 120 system to produce an enlarged area of illumination, when compared to the static beam.

In one embodiment, as shown in FIG. 3, a control circuit 200, using a standard H-bridge configuration, may be used to supply power to load 250. By activating switches 210, 220, 230 and 240, voltage, $V_{batt}$, from the battery 205 is alternately applied to each side of the load 250. Specifically, in a first state, switches 210 and 240 are closed and switches 220 and 230 are open, and current is allowed to flow from the battery 205 through switch 210, a first side of load 250 and switch 240 to a common ground 260. Alternatively, in a second state, switches 220 and 230 are closed while switches 210 and 240 are open, so current is allowed to flow from battery 205 through switch 220, a second side of load 250 and switch 230 to ground. Therefore, synchronously activating the first and second states will produce the effect of alternately applying a voltage to each side of load 250.

In another embodiment as shown in FIG. 4, a rotary solenoid 140 may be substituted for a motor 128. The rotary solenoid 140 is capable of being accurately positioned and rotated back-and-forth without the use of elastomeric members 120, as shown in FIG. 5, such that an enlarged area of illumination may be created from a focused static beam of light. In yet another embodiment as shown in FIG. 6, the use of linear solenoids 142 may be substituted for the motor 128 and elastomeric members 120. The linear solenoid 142 is attached to the reflector 112 and bulb 116 assembly such that synchronous displacement of the linear solenoid 142 causes the reflector 112 and bulb 116 assembly to move back-and-forth. As such, the movement creates an enlarged area of illumination having an intensity which is preferably substantially equivalent to that of a static beam of light.

Referring back to FIG. 1, a method for creating an enlarged area of light is also included in the present invention. First, a beam of light is created from an illumination source, generally including bulb 116 and reflector 112. The illumination source, 112 and 116, is then connected to an attachment means 120, and the illumination source, 112 and 116, is further directly attached to a means for moving 128. A rotation of the illumination source, 112 and 116, is produced by the means for moving 128 such that an enlarged or broad area of illumination is created where the intensity of the enlarged area is preferably substantially equivalent to that of a static beam of light.

Figure 7:
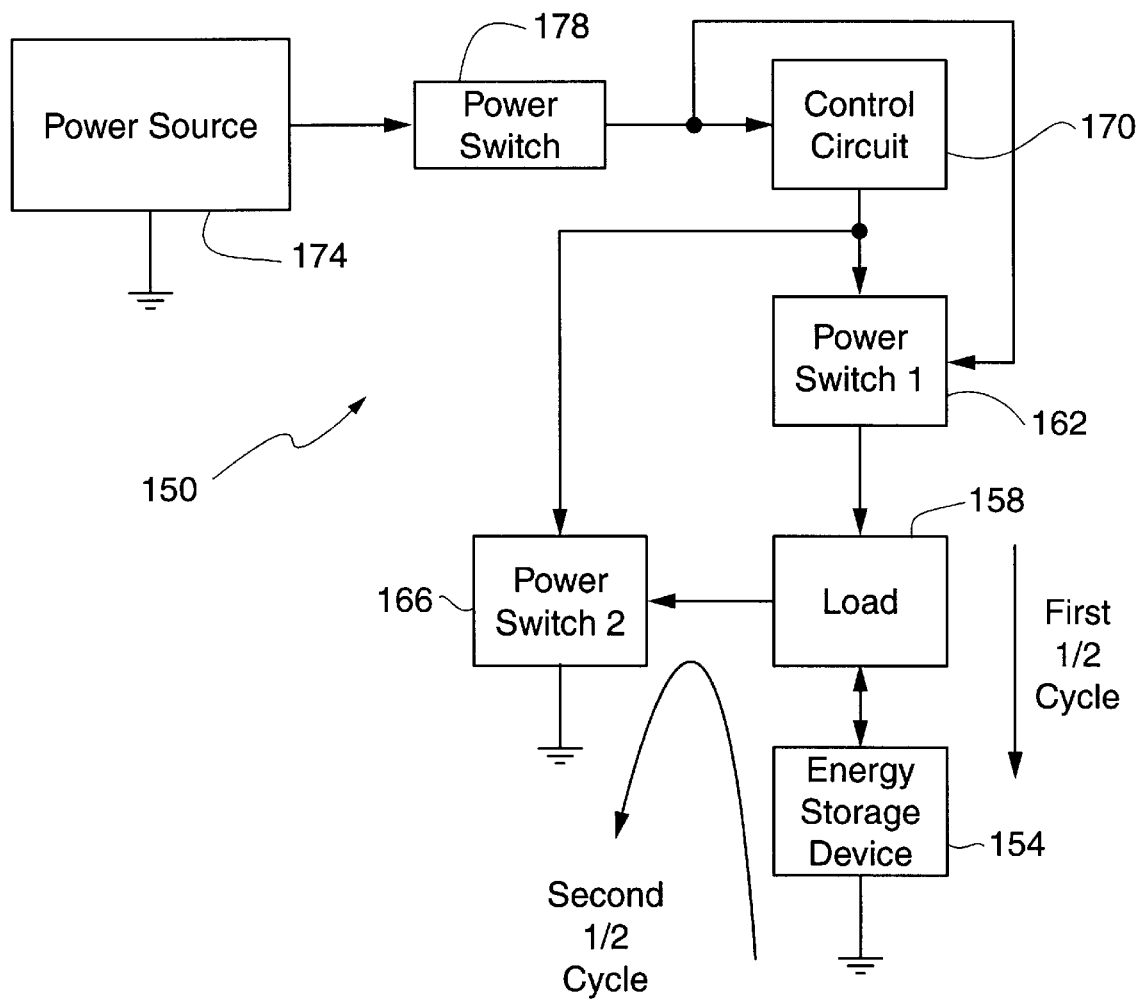
FIG. 7 is a block diagram of the energy reuse/DC notching reducer system.

In another embodiment of the invention, a power recycling system 150, shown in FIG. 7, may be provided in the illumination device 100, as shown in FIG. 1. Referring to FIG. 7, the power recycling system 150 includes an energy storing device 154 for storing and discharging energy produced from a power source 174. A load 158 is provided for performing needed tasks and functions (e.g. powering a light, operating a motor, etc.). In one embodiment, as shown in FIG. 1, the load 158, in FIG. 7, comprises the motor 128 for rotating the reflector 112 and bulb 116 assembly, and in another embodiment the bulb 116, along with the motor 128, may also be electrically connected as the load 158, in FIG. 7. A control system 170 and energizing switch 178 are provided where electric power may be recycled by manipulation of a first power switch 162 and a second power switch 166 such that electric power is recycled through the load 158 after being stored and discharged from an energy source 154.

In this embodiment, a first end of an energy storage device 154 is connected to a common ground while a second end of the energy storage device 154 is connected to a first end of the load 158. In a preferred embodiment, the energy storage device 154 comprises a capacitor. A second end of the load 158 is connected to the first power switch 162. The second power switch 166 is connected in parallel with the series combination of the load 158 and the energy storage device 154. In a preferred embodiment, the first and second power switches, 162 and 166, comprise transistors, but may also be relays, electromagnetic switches or solid state switches. Control system 170 is connected to both the first power switch 162 and the second power switch 166 for alternately energizing each switch such that one switch is open while the other switch is closed. An energy switch 178 selectively connects and disconnects the power source 174 from the control system 170.

Figure 8:
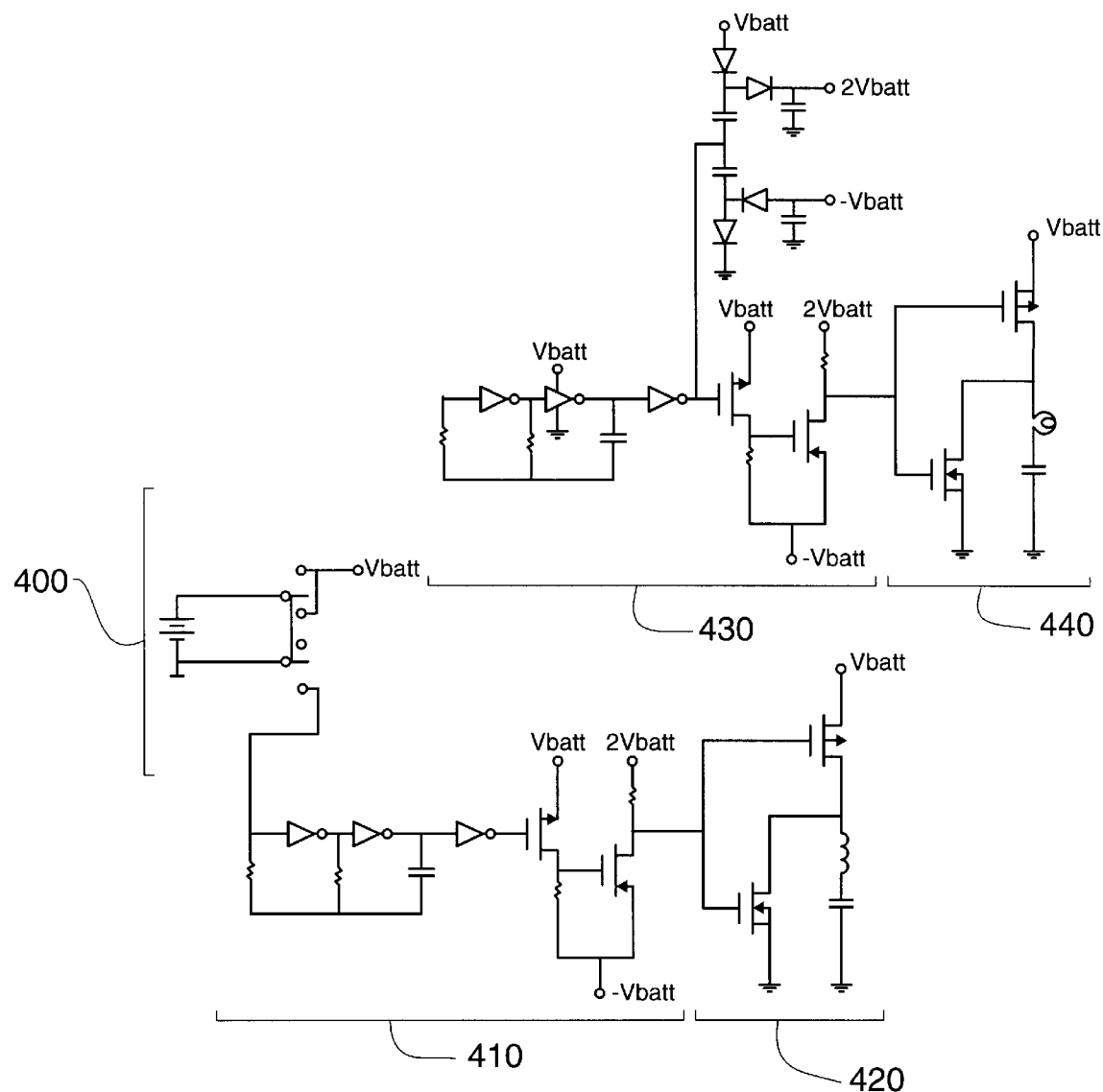
FIG. 8 shows a circuit diagram of the energy reuse and DC notching reducer systems.

In operation, in FIG. 7, the power recycling system 150 becomes active when the energizing switch 178 connects power source 174 to control system 170. As shown in another embodiment in FIG. 8, circuit 400 illustrates an energizing switch and a battery while circuits 410 and 430 illustrate control circuits used for implementing an energy recycling system. In a preferred embodiment, the power source 174, of FIG. 7, is a battery, but may also be a solar power source, an AC power source, a DC power source or an AC to DC converted power source. In operation, first power switch 162 is energized and placed in a conducting position to allow current to flow through the first power switch 162 and through the load 158, creating a charge in the energy storage device 154. At this point, the control system 170 selectively deactivates the first power switch 162 and activates the second power switch 166. Therefore, when the energy storage device 154 discharges, the power stored from the first half of the cycle is conveyed so that a current flows from the energy storage device 154, and again the current passes through the load 158, the second power switch 166 and to ground. The load 158 may comprise an electric motor, but in other cases the load 158 comprises a bulb. As shown in FIG. 8, circuits 420 and 440 also illustrate another switching embodiment, including a bulb, a motor, switches and storage devices, used in a power recycling system.

The electric recycling energy system 150 also inhibits the DC notching effect in the bulb filament. DC notching occurs in bulb filaments that allow current to pass only in one direction so as to cause a weakening in the bulb filament. As such, the effective life of the bulb filament is reduced. Therefore, when the energy recycling system includes a bulb as the load 158, the system becomes a DC notching effect reducer. In operation, the current is allowed to flow from a first to a second end of the bulb, and consequently, the current is stored in the energy storing device 154. As shown in an embodiment in FIG. 8, the power to the switching circuit 440 may be controlled by a control circuit 430 in a DC notching reducer system. When the first power switch 162 and the second power switch 166 are interchangeably activated and the energy storage device 154 discharges, the current is allowed to flow from the second end to the first end of the bulb and through the second power switch 166 to ground. As shown in FIG. 8, the switching circuit 440 illustrates an embodiment including switches, a bulb and an energy storing device that may be used in a DC nothing reducer system. This alternating flow of current through the bulb filament reduces the DC notching effect in the bulb.

In addition, recycling the power in this manner also creates the effect of decreasing the rate of power consumption from the power source 174 as compared to those systems that allow the current to only pass through the bulb filament in one direction. While not bound by theory, it is believed that the reduced power consumption is due to the fact that energy is drawn from the power source 174 for one half the time, and the other half of the time the energy is recycled from the energy storage device 154 through the load member 158 or the bulb in this case.

Figure 9A:
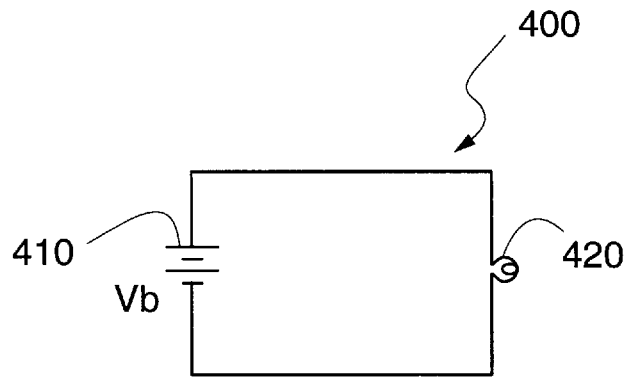
FIG. 9a shows a standard flashlight circuit.

Referring to FIGS. 9a circuit 400 illustrates a conventional flashlight circuit. Typically, a battery 410 are directly connected to a bulb 420. Two cell battery 410 may have a voltage, $V_b$, equivalent to 3 volts with an amp-hour charge of 8.3 amp-hours per cell. Using a conventional bulb, the current drawn is typically 0.7 amps. The power, P, may be expressed as:

P=i v
P=(0.7a) (3v)
P=2.1 watts

In addition, the runtime, RT, of circuit 400 may be calculated:

RT=discharge life/i bat
RT=8.3 amps-hrs/0.7 amp
RT=11.8 hours

So typically, the runtime of the conventional flashlight circuit is approximately 11.8 hours.

Figure 9B:
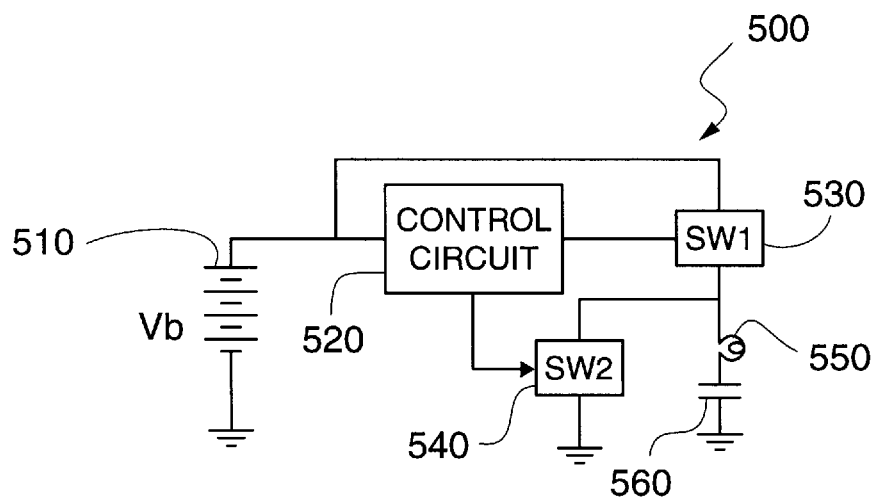
FIG. 9b shows another block diagram embodiment of the energy reuse system.
Figure 9C:
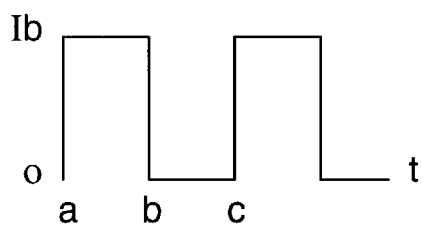
FIG. 9c shows a battery current waveform from the energy reuse system of FIG. 9b.

Referring to FIG. 9b, one embodiment of the present invention is shown a circuit 500. A battery 510 is connected to control circuit 520 which selectively activates switches 530 and 540. The selective activation of switches 530 and 540 allows current to pass through bulb 550 and to charge and subsequently discharge from capacitor 560. By selectively activating the switches 530 and 540 at a frequency of 1.0 Khertz, the current from the battery 510 may be represented by FIG. 9c, which illustrates a typical squarewave pulse having an amplitude of 0.7 amps. The pulse is at a value of 0.7 amps from time "a" to time "b" and a value of 0 amps from time "b" to time "c". At a frequency of 1.0 Khertz, the on and off times equal to 0.5 m sec. Therefore, since the battery 510 is supplying current for 0.5 msec and is off for the other 0.5 msec of the cycle, the current drawn from the battery 510 over the whole cycle from time "a" to time "c", i bat, is 0.35 amps.

Figure 9D:
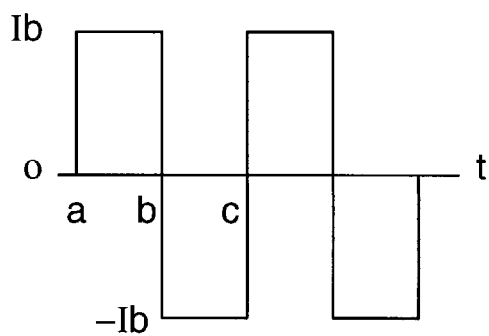
FIG. 9d shows a bulb current waveform of bulb 550 in FIG. 9b.
Figure 10:
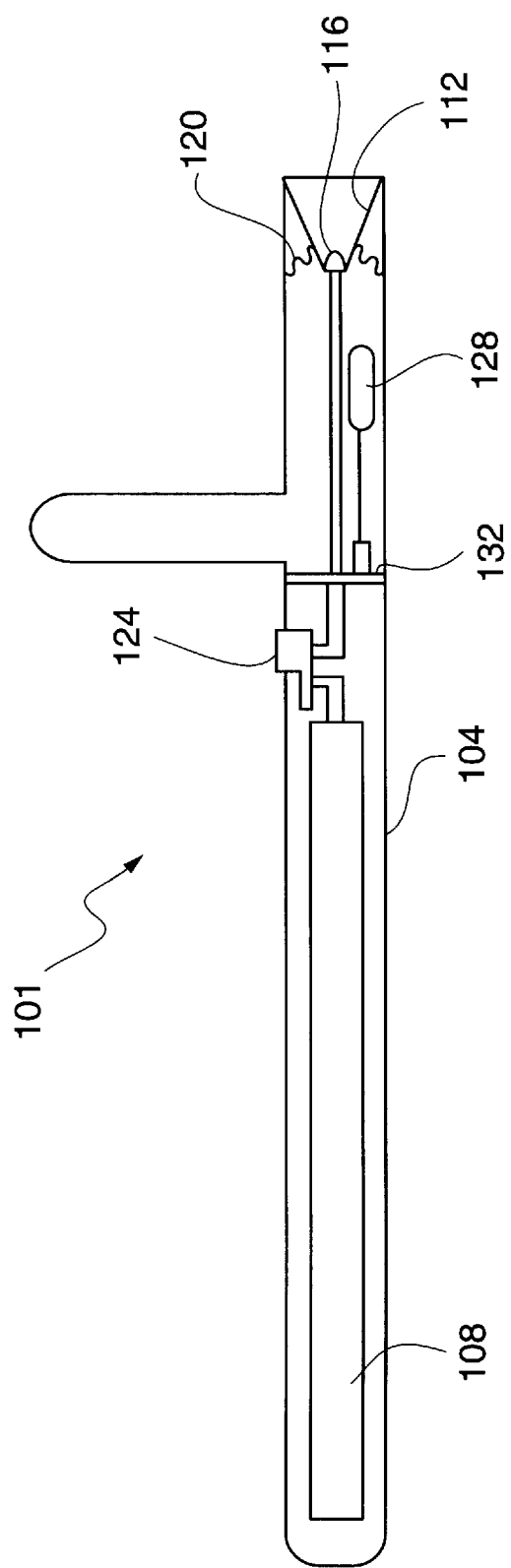
FIG. 10 shows one embodiment of the present invention contained in a police baton.

Referring to FIG. 9d, a waveform is shown that represents the current that passes through the bulb 550. Again, from time "a" to time "b", 0.5 msec at 1.0 Khertz, a current of 0.7 amps is being supplied from the battery to bulb 550 and is subsequently charging capacitor 560. From time "b" to time "c", 0.5 msec at 1.0 Khertz, the capacitor 560 discharges 0.7 amps through the opposite side of bulb 550 to ground. From this current the power, P, can be calculated:

P=i v
P=0.7 amp (3 volts)
P=2.1 watts

Therefore, the power obtained from the circuit in the present invention is equivalent to that of the standard flashlight circuit. As for the runtime, RT, calculation:

RT=amp. hours/i bat
RT=8.3 amp.hours/0.35 amp
RT=23.7 hours

Given the squarewave pulsing of the battery, a runtime of approximately 23.7 hours may be obtained from the circuit 500 in the present invention, as compared to a runtime of 11.8 hours from the standard flashlight battery circuit 400. Under these conditions, the present invention may increase battery life by approximately two times as compared to a standard flashlight circuit, at the cost of increasing the number of battery cells by two.

In addition, the present invention is directed to a method to extend the battery life of a device. Also referring to FIG. 7, in the method a power source or a battery 174 is operatively associated in a circuit 150. A current is generated from the battery 174 to a load member 158. After the current has passed through the load member 158, it is stored in an energy storage device 154 (e.g. a capacitor). Finally, the energy storage device 154 is discharged allowing current to flow through the load member 158 again and then to ground. By storing energy that is conveyed to a load member 158 but that is not entirely consumed in the process, it is possible to extend the life of a battery 174 responsible for the generation of energy used by the load member 158. The excess energy used to create a charge in the energy storage device 154 is recycled through the load member 158 when the energy storage device 154 discharges. This method only draws current from the battery 174 for one half the time because the other half of the time the energy is being recycled from the energy storage device 154. Using this method can extend battery life from two to three times as compared to conventional systems.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

It is claimed:

1. An illumination device comprising:
    (a) an illumination source for projecting a light beam, said illumination source contained within a housing;
    (b) a means for moving said illumination source, wherein said illumination source is rotated at a frequency to provide an increased area of light having an intensity perceived as being substantially equivalent to said light beam when viewed by an observer, wherein said means for moving is selected from the group consisting of a reciprocal electromagnetic driver, a piezoelectric driver, a rotary solenoid, a linear solenoid, and a motor; and
    (c) an attachment means for connecting said illumination source and said housing, wherein said attachment means is selected from the group consisting of a spring, an elastomeric band and a string; and
    wherein said attachment means comprises an elastomeric member that creates a mechanical resonance system where said means for moving excites said mechanical system to a resonant frequency for creating an enlarged area of illumination.

2. An illumination device, according to claim 1, further comprising a means for energizing said illumination source selected from the group consisting of a fuel cell, a battery, a solar power source, an AC power source, a DC power source and an AC to DC converted power source.

3. An illumination device, according to claim 1, wherein said means for moving rotates said illumination source at a frequency of at least 1 hertz.

4. An illumination device, according to claim 1, wherein said illumination device is selected from the group consisting of a flashlight, a street light, an automobile headlight, a security light and a display light.

5. An illumination device, according to claim 1, wherein said illumination device is portable or hand held.

6. An illumination device, according to claim 1, wherein said illumination source comprises a light bulb and a reflector.

7. An illumination device, according to claim 6, wherein said light bulb is selected from the group consisting of an incandescent bulb, a fluorescent bulb, a krypton bulb, a xenon bulb, a sulfur bulb, gas discharge bulb and a halogen bulb.

8. An illumination device, according to claim 1, wherein rotation of said illumination source extends through an angle of at least 10°.

9. An illumination device, according to claim 1 further comprising a switch selected from the group consisting of an electrical switch and a mechanical switch.

10. The device as set forth in claim 1, wherein said illumination source is capable of receiving electrical power from a means for receiving and supplying electrical power selected from the group consisting of a battery, a solar power source, an AC power source, a DC power source and an AC to DC converted power source, said illumination source having first and second terminals;
    an energy storing means for storing energy produced from a power source, said energy storing means having a first terminal connected to a common ground and a second terminal connected to said first terminal of said illumination source;
    a first switch having at least a first and second terminal, wherein said first terminal of said first switch is connected to said second terminal of said illumination source and said second terminal of said first switch is connected to said means for receiving and supplying electrical power;
    a second switch connected in parallel with a series combination of said illumination source and said means for storing electrical power, said first and second switches movable between a first and second state, said first state having said first switch closed and said second switch open and said second state having said first switch open and said second switch closed.

11. The device as set forth in claim 1, wherein said illumination source is capable of receiving electrical power from a means for receiving and supplying electrical power selected from the group consisting of a battery, a solar power source, an AC power source, a DC power source and an AC to DC converted power source, said load member having first and second terminals;
    an energy storing means for storing discharging energy produced from a power source, said energy storing means having a first terminal connected to a common ground and a second terminal connected to said first terminal of said illumination source;
    a first switch having at least a first and second terminal, wherein said first terminal of said first switch is connected to said second terminal of said illumination source and said second terminal of said first switch is connected to said means for receiving and supplying electrical power;
    a second switch connected in parallel with a series combination of said illumination source and said energy storing means, said first and second switches movable between a first and second state, said first state having said first switch closed and said second switch open and said second state having said first switch open and said second switch closed, whereby said energy storage means restores power by storing and discharging energy though said illumination source such that energy is drawn from said means for receiving and supplying electrical power for one half a time as compared to a system having current flow only through said illumination source to ground.

12. The device as set forth in claim 1, wherein said illumination source is a bulb that receives electrical power from a means for receiving and supplying electrical power, said device further comprising:
    an energy storing means for storing energy produced from a power source, said energy storing device having a first terminal connected to a common ground and a second terminal connected to said first terminal of said bulb;
    a first switch having at least a first and second terminal, wherein said first terminal of said first switch is connected to said second terminal of said bulb and said second terminal of said first switch connected to said means for receiving and supplying electrical power;
    a second switch, wherein said second switch is connected in parallel with a series combination of bulb and said means for storing electrical power, said first and second switches movable between a first and second state, said first state having said first switch closed and said second switch open and said second state having said first switch open and said second switch closed, said attachment means having first and second ends, said first end connected to said illumination source and said second end connected to said housing, said attachment means expanding and contracting in response to movement of said means for moving to produce an oscillating light beam.

13. An illumination device comprising:
(a) a means for receiving and supplying power, said means selected from the group consisting of a battery, a fuel cell, a solar power source an AC power source, a DC power source, and an AC converted power source;
(b) a bulb electrically connected to said means for receiving and supplying power;
(c) a reflector connected to said bulb;
(d) a motor connected to said reflector, wherein said reflector is rotated at a frequency providing for an increased area of light having an intensity perceived as being substantially equivalent to a light beam generated when said bulb is not being rotated;
(e) a housing containing said means for receiving and supplying power, said bulb, said reflector and said motor; and
(f) at least one elastomeric member connecting said reflector and said housing, said elastomeric member capable of expanding and contracting such that said reflector is moved to and fro to produce an oscillating light beam in response to movement of said motor.

14. A method for creating a large area of light comprising:
(a) creating a beam of light from an illumination source;
(b) connecting said illumination source to an attachment means selected from the group consisting of a spring, an elastomeric band and a string;
(c) providing a means for moving said illumination source, said means for moving selected from the group consisting reciprocal electromagnetic driver, a piezoelectric driver, a rotary solenoid, a linear solenoid and a motor; and
(d) moving said illumination source at a frequency to provide an increased area of light having an intensity that is perceived as being substantially equivalent to said light beam when viewed by an observer, said means for moving exciting a mechanical resonance system created by attachment means and said illumination source to achieve a resonant frequency of said illumination source, thereby creating an enlarged area of illumination.

15. A method for creating a large area of light, according to claim 14, wherein said attachment means is selected from the group consisting of a spring, an elastomeric band, a string, and a rod.

16. A method for creating a large area of light, according to claim 14, wherein said means for moving is selected from the group consisting of a reciprocal electromagnetic driver, a piezoelectric driver, a rotary solenoid, a linear solenoid, and a motor.

17. An illumination device comprising:
(a) an illumination source for projecting a light beam;
(b) a means for moving said illumination source selected from the group consisting of a reciprocal electromagnetic driver, a piezoelectric driver, a rotary solenoid, a linear solenoid, and a motor, wherein said illumination source is rotated at a frequency to provide an increased area of light having an intensity perceived as being substantially equivalent to said light beam when viewed by an observer; and
(c) an attachment means connected to said illumination source, wherein said attachment means is selected from the group consisting of a spring, elastomeric band and a string, wherein said attachment means comprises at least one elastomeric member that is attached to said means for moving and said illumination source, said elastomeric members counter wound and attached to said illumination source and said means for moving.

18. An illumination device comprising:
(a) a bulb positioned inside a reflector assembly positioned at a first end of a police baton having first and second ends;
(b) a battery assembly positioned at said second end of said police baton;
(c) a switch mounted on said police baton between said first and second ends, said switch having three positions which, respectively, cease operation of said bulb, provide a static source of illumination, and provide an oscillating source of illumination, said battery connected to a control circuit that activates said bulb and a motor, said motor being operatively connected to said reflector to provide movement of said reflector to create back and forth movement of said reflector;
(d) at least one spring operatively connected to said reflector and said baton, said at least one spring reversibly compressed and extended through operation of said motor;
(e) said baton having a housing containing said battery, said bulb, said reflector and said motor, wherein said reflector is rotated at a frequency providing for an increased area of light having an intensity perceived as being substantially equivalent to a light beam generated when said bulb is not being rotated.

* * * * *